3,562,748
PLASTIC AIR HORN
William C. Wetzel and Raymond W. Long, Bay City, Mich., assignors to Eltra Corporation, Toledo, Ohio
Filed Sept. 18, 1968, Ser. No. 760,412
Int. Cl. G08b 3/10
U.S. Cl. 340—388        8 Claims

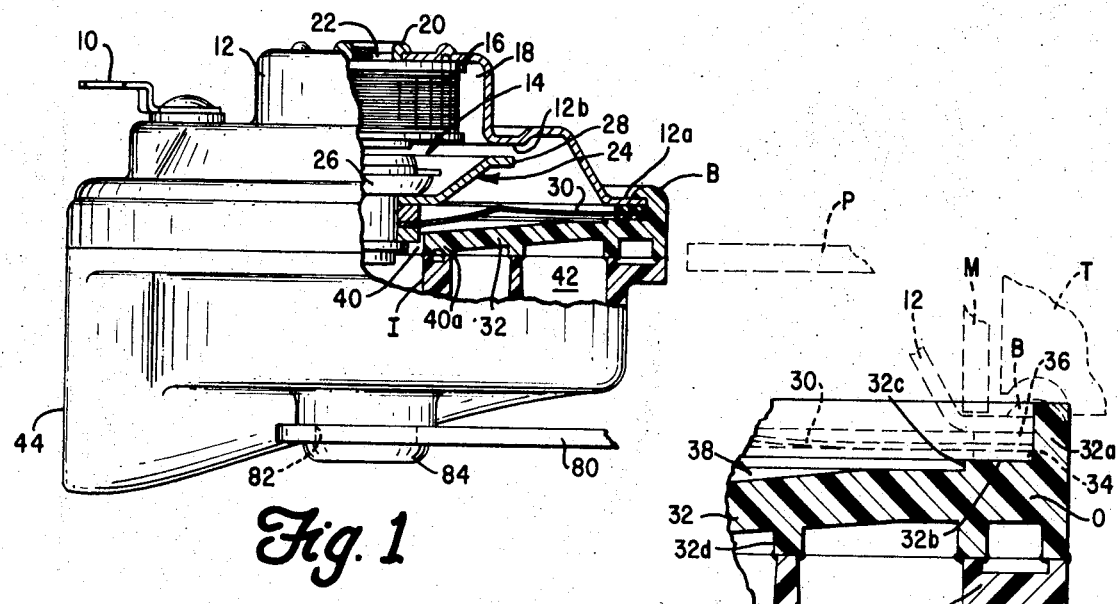
Fig. 1
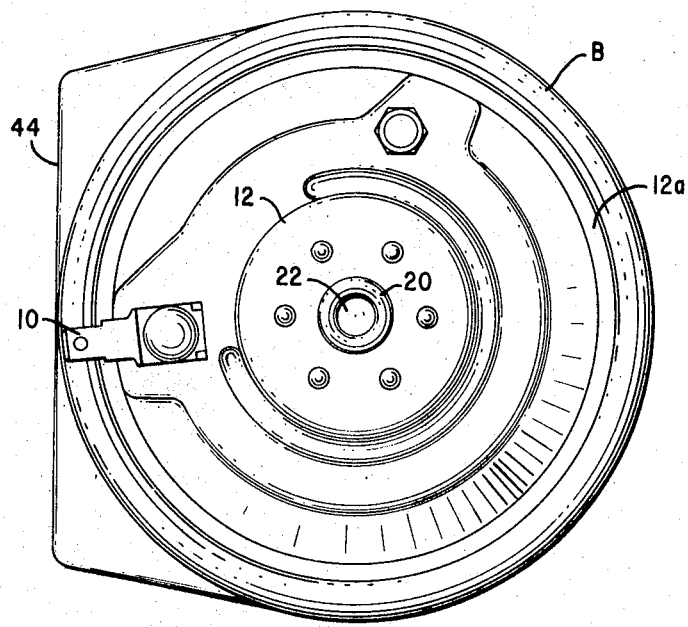
Fig. 3
Fig. 2
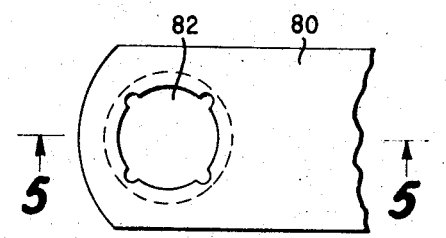
Fig. 4
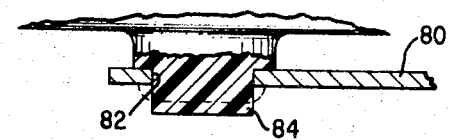
Fig. 5
INVENTOR.
WILLIAM C. WETZEL
RAYMOND W. LONG
BY
ATTORNEY United States Patent Office 3,562,748
Patented Feb. 9, 1971

ABSTRACT OF THE DISCLOSURE

An electric air horn, having a resonating chamber, is formed of two molded thermoplastic resin body portions permanently joined together in a plane by heat. The resonating chamber is connected to a collapsing air chamber formed by a vibratory diaphragm cooperating with one side of the resin portions, the diaphragm being vibrated by an electric motor. The diaphragm and the motor base member are permanently joined together under predetermined tension in a peripheral area by a flange portion of the resin body created by a thermoplastic reform of the flange.

---

In the manufacture of horns, cheapness is the desideratum that must continuously be considered, and often the sale of these horns to automotive fabricators hinges solely on price, assuming a standard for performance and quality. The number of parts that are used in the manufacture of those horns is therefore of great importance and cheapness of material must also be considered.

It is therefore a principal object of this invention to cheapen the cost of manufacture of horns by using resinous materials which are thermoplastic by which certain steps in the manufacture can be avoided or lessened in cost.

It is a further object of this invention to use thermoplastic resinous materials in horns which can be reformed by heating to provide a simple holding means for parts under pressure.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

In the drawings, FIG. 1 is an elevational view partly in section of a horn to which the invention has been applied;

FIG. 2 is a plan view of the horn shown in FIG. 1;

FIG. 3 is a sectional elevation of a portion of the horn adjacent the perimeter of the diaphragm showing tools in phantom;

FIG. 4 is a plan view showing the method of attaching the bracket to the main body of the horn; and FIG. 5 is a cross-sectional view taken along line 5—5 of FIG. 4.

Referring to the drawings, particularly to FIG. 1, an air horn is shown to which the invention has been applied. The horn is adapted to be used with automotive vehicles in connection with the electrical system thereof, conventionally a 12-volt system, having a battery and charging system as is well known in the art and need not be shown. The electrical power is supplied to the horn by conventional wire leads attached to a terminal 10 or terminals attached to a circular base member 12 in insulated relation, which is in electrical circuit with a vibrator motor 14 of a conventional type. The solenoid 16 of the vibratory motor is mounted in a cup-shaped depression 18 of the base member 12 by a hollow rivet 20 which is formed with a threaded central aperture 22 to attach a mounting bracket by a bolt (not shown) for mounting the horn on the vehicle.

The armature 24 of the vibratory motor 14 has a central stud 26 and a cup-shaped magnetic member 28 to attach the armature parts to a vibratory diaphragm 30, which has the same diameter as the outer flange 12a of the base member 12. The cup-shaped magnetic member 28 cooperates with a flat lip 12b of the base member as shown with an air gap therebetween to allow for movement of the armature and diaphragm during vibratory movement when electrical power is supplied to the motor. The electrical circuit is broken by contact points (not shown) when a predetermined movement of the armature under the magnetic attraction has been attained, thereby causing the vibratory movement of the motor armature and its attached diaphragm.

Facing the diaphragm 30 and cooperating with it to form a collapsible air chamber is a face plate 32 molded from a suitable resinous material such as glass fiber-loaded polystyrene resin, which is given a dished conformation on the side facing the diaphragm having a peripheral flange 32a which overlies the peripheral edges of the base member 12 and also the peripheral edge of the diaphragm 30, extending a substantial distance above the assembly as best seen in FIG. 3. Fiber gaskets 34 and 36 are provided on opposite sides of the diaphragm as shown. An annular pressure platform 32b is positioned immediately inside of the flange 32a, terminating in a shoulder 32c, on which fiber washer 34 rests to give clearance for the vibrations of the diaphragm 30 as it moves to and fro to collapse and expand the air chamber 38 formed between the relatively moving members. The air chamber 38 communicates with a central aperture 40 in the face plate 32 into which the central stud 26 of the diaphragm assembly projects and moves during vibration thereof as best seen in FIG. 1. The aperture 40 communicates with the inner end of a resonating chamber 42 which is spiral in form and terminates in an outwardly facing bell 44 as is well known in the art.

The resonating spiral air chamber 42 has a resonating frequency which is matched to the vibratory frequency of the vibratory electric motor 14, so that when the motor collapses the chamber 38, the resonator 42 is excited and an air note issues from the bell 44.

The resonator 42 is fabricated from two molded elements of the same thermoplastic material, one of which has already been described, in the face plate 32 which has provided on its lower face a spiral depending flange 32d, the lower edge of which terminates in a plane surface to cooperate and engage the upper surface of a matching flange 42a on the main resonator body 42, to form the spiral air chamber between the cooperating members, beginning at the central aperture 40 communicating with the collapsible air chamber 38, and terminating at the bell 44 open to the atmosphere.

The two cooperating members 32 and 42 which form the spiral resonator for the air horn are adhered to each other by the softening of the materials from which they are fabricated being thermoplastic, so that when mating parts are softened by heat and thrust together while adjacent parts are fluid, the parts are bonded permanently together. In order to facilitate the heating of the adjacent parts by, for example, plate P, the inner walls 40a and I of the aperture 40 and the outer walls O and 42b of the members forming the resonator are grooved to reduce the area of contact between them, whereby the cooperating and adhering surfaces are more easily brought to the right temperature by contact with the hot plate P. When this temperature is attained and the surfaces are superficially fluid, the hot plate P is removed and the parts are pressed together with a predetermined pressure which may cause a slight extrusion of the thermoplastic material to form an outer bead.

The thermoplastic resin from which the resonator members are fabricated is selected as having suitable properties such as a polystyrene loaded with 20 to 30 percent of long glass fibers, being available in the open market under the trade name "Styrafil."

As has already been described, the outwardly extending flange 12a of the body member of the vibratory motor and the periphery of the diaphragm 30 positioned between the two gaskets 34 and 36 are stacked within the thermoplastic flange 32a of the face plate 32 as shown in FIG. 3, against the pressure platform 32b. With the resinous body portions 32 and 42 in assembled relation, the outer shoulder S of the assembly is positioned on anvil A, and a pressure member M is lowered to press against the upper surface of the flange 12a with a pressure of about 3 tons to apply a predetermined pressure to the parts. Holding the pressure on the parts, heat is applied to the terminal end of the flange 32a until it is softened to a point at which it can be reformed by a reforming tool T, which moves the flange material inwardly to form a bead B which overlies the stacked assembly on which the pressure is still being held. The tool T is massive and cools the reformed flange until it hardens, or cooling water or other means can be utilized to cool the tool T until hardening of the thermoplastic resin occurs. When the hardening of the resin is sufficient to reconstitute the strength of the resin, the pressures on the parts are removed, which creates predetermined pressure relations between the cooperating parts to allow the horn to operate when the vibratory motor is energized by electrical power. The deformed thermoplastic resin of the flange 32a creates a permanent holding means for the operative parts of the horn.

FIGS. 4 and 5 disclose a second method of mounting the air horn, which assembles a metal bracket strip 80 punched with a non-circular aperture 82 which is fitted on a cylindrical projection 84 on the resonator 42, which is formed of thermoplastic material as already described. The terminus of the projection 84 is heated and upset by a suitable tool, which expands the thermoplastic material to expand into the non-circular aperture 82 to fix it thereto and also overhang the strip 80 as shown in FIG. 1. This permanently affixes the mounting bracket 80 to the horn body. When a bolt is used to attach the mounting bracket on the opposite side by threading into aperture 22, only one terminal 10 is required as the metal parts can be grounded to the body of the vehicle. When the mounting bracket 80 is used as described, the grounding to the vehicle body does not occur, due to the insulated relation at the resinous projection 84, so that a second terminal similar to 10 must be used to establish the electric power circuit to the vibratory motor.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for the purpose of description and not of limitation, and it is not intended to limit the scope of the following claims beyond the requirements of the prior art.

What is claimed is:

1. In an air horn, a vibratory motor operated by electrical power, a substantially circular metal base member for mounting stationary portions of said vibratory motor, a vibratory diaphragm driven by the vibratory motor adapted to cooperate with the base member at its periphery, a face plate of thermoplastic resinous material adapted to cooperate with the vibratory diaphragm at its periphery to form a collapsible air compression chamber therewith, a central opening in said face plate in communication with the air compression chamber, a flange on the periphery of the face plate extending over the peripheral edges of the base member and the vibratory diaphragm adapted to be thermoplastically reformed to permanently hold the base member and the vibratory diaphragm together under predetermined pressure conditions, and a front member adapted to cooperate with the face plate to which it is permanently attached to form a resonating chamber communicating at its inner end with the compression chamber via the central opening in the face plate with an outwardly facing bell to emit a musical sound when excited by the vibratory diaphragm collapsing the compression chamber.

2. The air horn defined in claim 1 further characterized by forming the base member of magnetic material so that it functions as a portion of the vibratory motor and as a housing member.

3. The air horn defined in claim 1 further characterized by the front plate being molded of thermoplastic resin.

4. The air horn defined in claim 3 further characterized by attaching the thermoplastic front plate to the face plate by softening the cooperating portions by heat and adhering the parts together.

5. In a horn, a vibratory motor operated by electrical power, a substantially circular base member for mounting stationary portions of said vibratory motor, a vibratory diaphragm driven by the vibratory motor adapted to cooperate with the base member at its periphery, a plate of thermoplastic resinous material adapted to cooperate with the vibratory diaphragm at its periphery, and a flange on the periphery of the plate extending over the peripheral edges of the base member and the vibratory diaphragm adapted to be thermoplastically reformed to permanently hold the base member and the vibratory diaphragm together under predetermined pressure conditions.

6. The horn defined in claim 5 further characterized by the base member being formed of magnetic metal to provide a magnetic circuit for the vibratory motor.

7. The horn defined in claim 5 further characterized by the reformed flange on the plate being moved inwardly to overhang the base member when under plastic condition and cooled while the pressure conditions are maintained on the parts.

8. The horn defined in claim 5 further characterized by a front member which is attached to the front of the plate by thermoplastic adherence.

References Cited

UNITED STATES PATENTS

| | | | |
|---|---|---|---|
| 2,803,004 | 8/1957 | White | 340—388 |
| 2,839,746 | 6/1958 | Rice | 340—388 |
| 2,942,255 | 6/1960 | Wetzel | 340—388 |
| 3,179,932 | 4/1965 | Gregoroff | 340—388 |
| 3,425,057 | 1/1969 | Doggart | 340—388 |

HAROLD I. PITTS, Primary Examiner

U.S. Cl. X.R.

340—384